Figure 1:
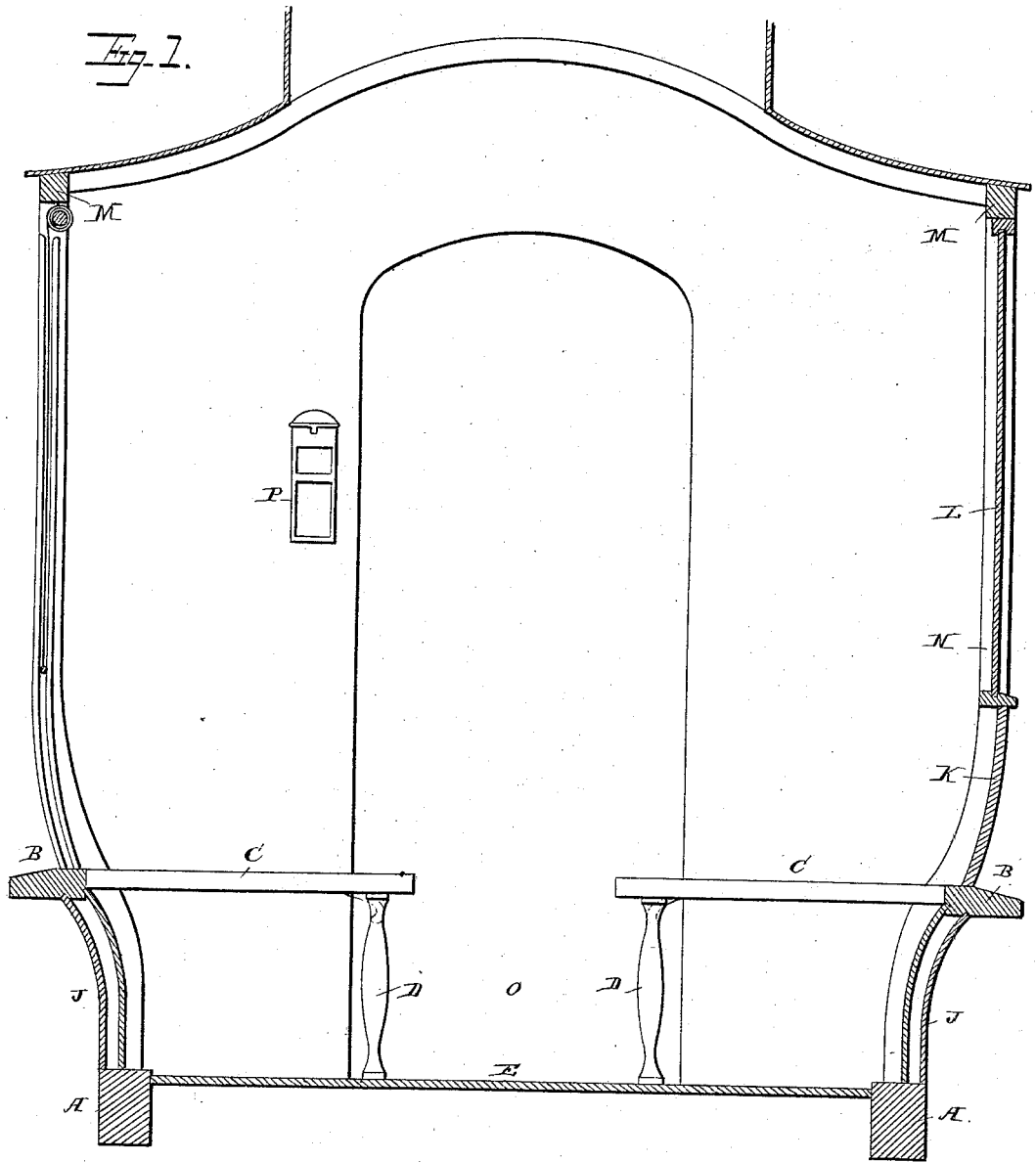

(No Model.) 3 Sheets—Sheet 1.

J. STEPHENSON.
AISLE CAR.

No. 378,480. Patented Feb. 28, 1888.

Witnesses
Wm. A. Harries
Chas. Morris, Jr.

John Stephenson
Inventor:
by Foster & Freeman
Attorneys (No Model.) 3 Sheets—Sheet 3.

J. STEPHENSON.
AISLE CAR.

No. 378,480. Patented Feb. 28, 1888.

Attest:
Wm A Harries
Chas. Morris, Jr.

John Stephenson
Inventor:
by Inter & Freeman
attys.

UNITED STATES PATENT OFFICE.

JOHN STEPHENSON, OF NEW YORK, N. Y.

AISLE-CAR.

SPECIFICATION forming part of Letters Patent No. 378,480, dated February 28, 1888.

Application filed August 3, 1887. Serial No. 246,049. (No model.)

*To all whom it may concern:*

Be it known that I, JOHN STEPHENSON, a citizen of the United States, and a resident of the city, county, and State of New York, have invented certain new and useful Improvements in Aisle-Cars, of which the following is a specification.

On tramways open cars for summer, and especially in warm climates, have long been used; but such have required both a driver and a conductor for each car, and were not suitable for tramways using small fare-box cars operated alone by the driver, which are best for places with small populations, and also best for pioneer tramways until patronage exceeds the capacity of small cars.

Small open fare-box cars with side seats have been found unpleasant for the passengers, because of riding with their backs outward.

Fare-box cars with aisle through the center and seats crosswise have been more popular, especially when all passengers face frontward; but this necessitates turn-tables or equivalent at the termini of the routes. A partial remedy was in constructing the seats in couples *vis-à-vis*; but this required half of the passengers to ride backward and was attended with other inconveniences.

As the larger number of tramways in the United States have cars operated by the driver only, and passengers deposit fares in a fare-box located at the end of the car where the driver is, it is therefore necessary for such construction of car that they afford free way for passengers to reach the pay-box, and cars which run either end foremost must have a fare-box at each end. It is also desirable that cars with transverse seats should be so constructed that all passengers may sit facing frontward, because otherwise it is repulsive to some passengers; but the ordinary method of reversing seats by turning over the backs is impracticable in tram-cars, because the width of car required would be inadmissible in city streets. The necessities of this kind of tram-car, with fare-box at each end of the car, are that, first, the car-body encumber the street as little as possible; second, that it have a fare-box at each end; third, that passengers may have easy access to the pay-box nearest the driver; fourth, that the pay-box remote from the driver have its mouth closable to prevent deposit of fares beyond cognizance of the driver; fifth, that passengers may all sit facing forward; sixth, that reversing seats may be quickly accomplished and the seats held in adjusted position.

My improved tram-car illustrated in the accompanying drawings remedies the difficulties above narrated, supplies the necessities, and secures other advantages, in which drawings—

Figure 2:
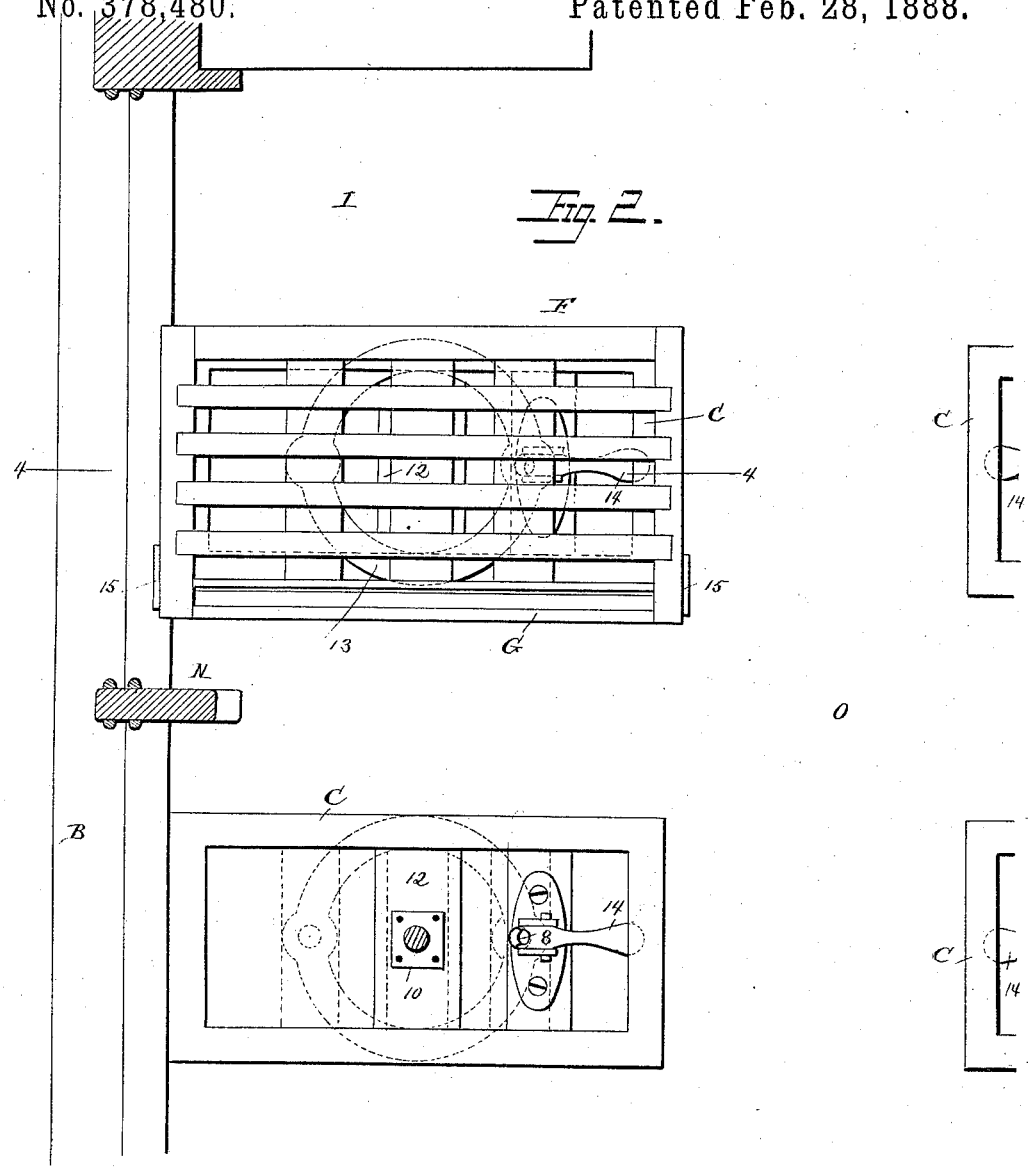
Figure 3:
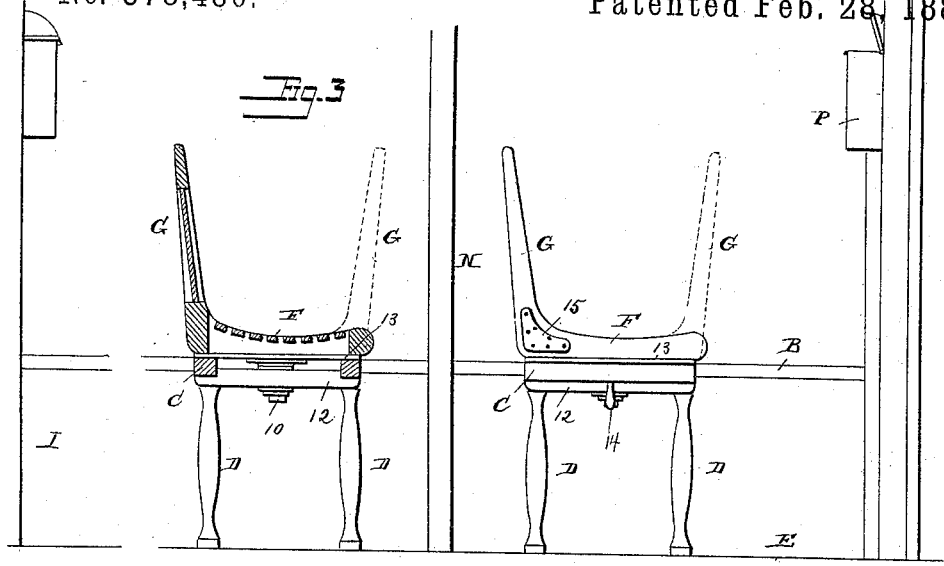
Figure 4:
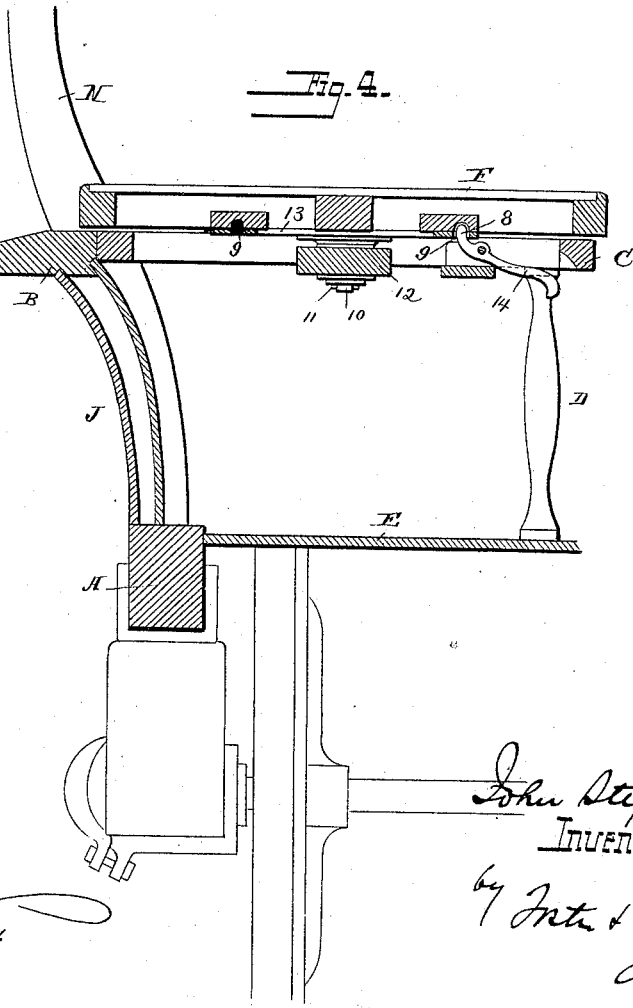

Figure 1 is a vertical cross-section of a car, the seats being removed from the seat-frames. Fig. 2 is a partial horizontal section of a portion of the car, taken on a line just above the backs of the seats, and illustrating one seat in place, a seat-frame, and a portion of two frames upon the opposite side of the car-aisle. Fig. 3 is an elevation, looking from the interior of the car, of two seats and their frames and a portion of the car. Fig. 4 is an enlarged sectional elevation of a car seat and frame, taken on the line 4 4 of Fig. 2.

In constructing the car-body I place at suitable distance above the car-sill a fender-rail or false-bottom side, B, which acts also as a seat-rail supporting the outer ends of the transverse seat stools or frames C, whose inner ends are sustained by legs D, fastened to the car-floor E, and on these stools rest the seats proper, F, with their backs G. The seats and the seat stools or frames C are arranged, as shown, transversely of the car and adjacent to the car sides, so as to leave an aisle, O, permitting passengers to pass through the center of the car to the fare-box P at the front of the car, as well as to either of the seats. Under the center of each seat proper is secured a vertical center pin or axis, 10, around which the seat rotates horizontally. This axis lodges in a transom-plate, 12, of the stool or frame C, and the lower end of the axis, after passing down through the transom of the stool, is there retained by a nut or key, 11, to prevent the seat from tilting when passengers lean against the seat-backs G. The under surface of the seat proper is provided with a circular plate, 13, in which are holes or indents 9, to receive the ends 8 of a weighted lever, H, attached to the stool and automatically forced up into the hole or indent when the seat proper is rotated to the point of adjustment, and further rotation is prevented.

As the seat-back has no legs extending to the floor to support the back, as in a chair, and the ordinary frame-work is insufficient, I re-enforce the joint connecting the back and seat by a metal plate, 15, extending each way beyond the joint, with proper fastenings to back and seat.

Rotating seats require more length of car-body to afford floor room to passengers occupying the front seats; but I utilize the space behind the back seat by adapting it as standing room for four passengers.

In streets crowded with vehicles a very small space will sometimes prevent "block" or jam. The hubs of wheels and projecting ends of axles are the points of contact with a car. Therefore in this aisle-car, instead of carrying the side walls vertically from roof to sill and extending the width of the floor to meet the vertical line of the pillars, I contract the width of the floor to a point which the length of axle will permit, (see Fig. 4,) and make the rise in a concave curve, J, from sill A to fender B, thus removing the part of the car most liable to contact vehicles and cause obstruction in the streets.

It is sometimes desirable that open or summer cars have some shiftable arrangement by which they may be readily closed to be used in cold weather. This I accomplish by making a panel, K, substitute for each curtain-space, and insert in the panel glass, L, of such form and size as may be desirable. I make such panel to extend from the false-bottom side B to the sub top rail, M, and the vertical edges of each section secured to its corresponding pillar.

What I claim is—

1. A tram-car having an aisle through its center, a series of transverse stools arranged upon opposite sides of said car, with their outer ends secured to the false-bottom side or fender-rail of the car and forming a portion of the stools, a series of transverse benches consisting of a seat and a back fixedly secured thereto, centrally pivoted on a fixed pivot upon said stools, and adapted to rotate horizontally thereon, and a locking device to secure each transverse bench in its adjusted position to the stool, substantially as described.

2. A tram-car having an aisle through its center, a series of transverse stools arranged upon opposite sides of said car, with their outer ends secured to the false bottom or fender-rail of the car and forming a portion of the stools, a series of transverse seats pivoted upon said stools, adapted to horizontal rotation thereon, and provided with a circular plate upon its under side, and a weighted lever device mounted on the stool and adapted to engage with said plate to hold the seat against rotation, substantially as described.

3. A tram-car provided with a false bottom side or fender-rail, B, a foot-panel consisting of the concave-curved side J, extending between said rail and the car-sill, transverse stools having their upper surface flush with the upper surface of said fender-rail, and seats mounted upon said stools to rotate horizontally thereon and having their outer ends lapping over and resting on the fender-rail, substantially as described.

4. A tram-car provided with a series of permanent stools arranged transversely of the car, with a standing-room space between said stools and the car ends, armless seats with their backs supported by metal plates at the angle uniting seats and backs, seats mounted to rotate horizontally on said stools, a center aisle through the car, and a fare-box at each end of the car, as and for the purpose described.

5. A tram-car provided with a series of permanent stools arranged transversely of the car and a series of benches pivotally mounted to rotate horizontally on said stools, said benches consisting of a fixed back and sideless seat united at their sides by metallic corner plates 15, substantially as described.

6. A tram-car provided with permanent stools and horizontally-rotating seats pivotally mounted thereon and having upon their under side holes or indents, and a weighted lever pivotally mounted to each of the stools and to be held therein by the weight of the lever, having ends adapted to enter said holes to lock the seats to the stools, substantially as described.

In testimony whereof I have signed my name to this specification in the presence of two subscribing witnesses.

JOHN STEPHENSON.

Witnesses:
  S. A. STEPHENSON,
  JOHN A. TACKABERRY.